US008386337B2

(12) United States Patent
Siegel

(10) Patent No.: US 8,386,337 B2
(45) Date of Patent: *Feb. 26, 2013

(54) SYSTEM AND METHOD FOR SINGLE-ACTION RETURNS OF REMOTELY PURCHASED MERCHANDISE

(75) Inventor: Philip S Siegel, Austin, TX (US)

(73) Assignee: Newgistics, Inc., Austin, TX (US)

( * ) Notice: Subject to any disclaimer, the term of this patent is extended or adjusted under 35 U.S.C. 154(b) by 2045 days.

This patent is subject to a terminal disclaimer.

(21) Appl. No.: 09/817,353

(22) Filed: Mar. 26, 2001

(65) Prior Publication Data

US 2001/0047315 A1    Nov. 29, 2001

Related U.S. Application Data

(60) Provisional application No. 60/191,811, filed on Mar. 24, 2000.

(51) Int. Cl.
*G06Q 30/00* (2006.01)
*G06Q 10/00* (2006.01)

(52) U.S. Cl. .................. 705/26.8; 705/14.56; 705/28

(58) Field of Classification Search ............... None
See application file for complete search history.

(56) References Cited

U.S. PATENT DOCUMENTS

| | | | |
|---|---|---|---|
| 5,515,447 A | 5/1996 | Zheng et al. | 382/100 |
| 5,715,314 A | 2/1998 | Payne et al. | 380/24 |
| 5,715,399 A | 2/1998 | Bezos | 395/227 |
| 5,724,424 A | 3/1998 | Gifford | 380/24 |
| 5,727,163 A | 3/1998 | Bezos | 395/227 |
| 5,812,668 A | 9/1998 | Weber | 380/24 |
| 5,815,657 A | 9/1998 | Williams et al. | 395/186 |
| 5,828,840 A | 10/1998 | Cowan et al. | 395/200.33 |
| 5,848,399 A * | 12/1998 | Burke | 705/27 |
| 5,850,446 A | 12/1998 | Berger et al. | 380/24 |
| 5,860,068 A | 1/1999 | Cook | 705/26 |
| 5,878,139 A | 3/1999 | Rosen | 380/24 |
| 5,889,863 A | 3/1999 | Weber | 380/25 |
| 5,899,980 A * | 5/1999 | Wilf et al. | 705/26 |
| 5,937,394 A | 8/1999 | Wong et al. | 705/26 |
| 5,943,424 A | 8/1999 | Berger et al. | 380/25 |
| 5,960,411 A | 9/1999 | Hartman et al. | 705/26 |
| 5,963,916 A | 10/1999 | Kaplan | 705/26 |
| 5,963,924 A | 10/1999 | Williams et al. | 705/40 |
| 5,963,949 A | 10/1999 | Gupta et al. | 707/100 |
| 5,970,469 A | 10/1999 | Scroggie et al. | 705/14 |
| 5,978,774 A | 11/1999 | Rogers et al. | 705/24 |
| 5,983,208 A | 11/1999 | Haller et al. | 705/40 |
| 5,984,508 A | 11/1999 | Hurley | 364/479.07 |

(Continued)

OTHER PUBLICATIONS

Goldblatt, Stores, Online Retailers Prepare fopr Returns,Tribune Business News, Dec. 1999.*

(Continued)

*Primary Examiner* — Mussa A Shaawat
(74) *Attorney, Agent, or Firm* — Baker Botts L.L.P.

(57) ABSTRACT

A system and method for performing single-action returns of remotely purchased merchandise is provided. The system preferably includes at least one server and at least one client coupled via a network. The server is preferably operable to identify the user of the client system and retrieve a transaction listing for the identified user. The client system preferably displays the transaction listing to the user and allows the user to perform a single action to select transactions and/or merchandise for returns processing. In response to the single action performed, the server system preferably initiates and completes a returns process based upon stored user preferences for such returns. The returns process can include returning merchandise to the retailer from which it was purchased, auctioning the unwanted merchandise, notifying a shipping agent of the return as well as other return procedures.

21 Claims, 5 Drawing Sheets

U.S. PATENT DOCUMENTS

| | | | |
|---|---|---|---|
| 5,987,132 A | 11/1999 | Rowney | 380/24 |
| 5,987,140 A | 11/1999 | Rowney et al. | 380/49 |
| 5,999,924 A | 12/1999 | Bair et al. | 707/4 |
| 6,002,767 A | 12/1999 | Kramer | 380/24 |
| 6,003,024 A | 12/1999 | Bair et al. | 707/3 |
| 6,006,225 A | 12/1999 | Bowman et al. | 707/5 |
| 6,015,167 A | 1/2000 | Savino et al. | |
| 6,016,480 A | 1/2000 | Houvener et al. | 705/21 |
| 6,016,484 A | 1/2000 | Williams et al. | 705/39 |
| 6,018,719 A | 1/2000 | Rogers et al. | 705/24 |
| 6,029,150 A * | 2/2000 | Kravitz | 705/39 |
| 6,085,172 A * | 7/2000 | Junger | 705/28 |
| 6,188,994 B1 * | 2/2001 | Egendorf | 705/40 |
| 6,192,347 B1 | 2/2001 | Graff | 705/36 |
| 6,246,997 B1 * | 6/2001 | Cybul et al. | 705/27 |
| 6,269,344 B1 | 7/2001 | Junger | 705/28 |
| 6,321,211 B1 * | 11/2001 | Dodd | 705/26 |
| 6,327,576 B1 * | 12/2001 | Ogasawara | 705/22 |
| 6,453,352 B1 | 9/2002 | Wagner et al. | |
| 6,497,408 B1 | 12/2002 | Walker et al. | 273/138.1 |
| 6,526,393 B1 | 2/2003 | Fredman | 705/408 |
| 6,536,659 B1 | 3/2003 | Hauser et al. | 235/375 |
| 6,547,136 B1 | 4/2003 | Sansone | 235/385 |
| 6,616,189 B2 | 9/2003 | Raming | 283/81 |
| 6,754,637 B1 | 6/2004 | Stenz | 705/26 |
| 6,757,663 B1 | 6/2004 | Rogers et al. | 705/24 |
| 6,834,268 B2 | 12/2004 | Junger | 705/28 |
| 6,865,560 B1 | 3/2005 | Sansone et al. | |
| 6,974,928 B2 | 12/2005 | Bloom | 209/583 |
| 6,980,962 B1 * | 12/2005 | Arganbright et al. | 705/26 |
| 7,062,473 B1 | 6/2006 | Taylor | 705/402 |
| 7,197,475 B1 | 3/2007 | Lorenzen et al. | 705/26 |
| 7,376,572 B2 | 5/2008 | Siegel | |
| 2001/0011231 A1 * | 8/2001 | Junger | 705/23 |
| 2001/0032141 A1 | 10/2001 | Drattell | 705/26 |
| 2001/0032143 A1 * | 10/2001 | Haseltine | 705/26 |
| 2001/0032147 A1 | 10/2001 | Siegel | 705/26 |
| 2001/0037207 A1 * | 11/2001 | Dejaeger | 705/1 |
| 2001/0037247 A1 | 11/2001 | Haseltine | |
| 2002/0010634 A1 * | 1/2002 | Roman et al. | 705/26 |
| 2002/0010689 A1 | 1/2002 | Tibbs et al. | 705/408 |
| 2002/0013744 A1 | 1/2002 | Tsunenari et al. | |
| 2002/0019777 A1 | 2/2002 | Schwab et al. | 705/26 |
| 2002/0019785 A1 * | 2/2002 | Whitman | 705/28 |
| 2002/0032573 A1 | 3/2002 | Williams et al. | 705/1 |
| 2002/0032612 A1 * | 3/2002 | Williams et al. | 705/26 |
| 2002/0077976 A1 | 6/2002 | Meyer et al. | |
| 2002/0082920 A1 | 6/2002 | Austin et al. | |
| 2002/0083007 A1 | 6/2002 | Sutherland et al. | |
| 2002/0095306 A1 | 7/2002 | Smith et al. | 705/1 |
| 2002/0128915 A1 | 9/2002 | Haseltine | |
| 2002/0133425 A1 | 9/2002 | Pederson et al. | 705/26 |
| 2002/0138356 A1 | 9/2002 | Dutta et al. | 705/26 |
| 2002/0152093 A1 | 10/2002 | Chalmers et al. | 705/1 |
| 2002/0178076 A1 | 11/2002 | Ross | 705/26 |
| 2002/0188531 A1 * | 12/2002 | Junger | 705/28 |
| 2003/0023496 A1 | 1/2003 | De Mol Van Otterloo et al. | 705/22 |
| 2003/0061104 A1 | 3/2003 | Thomson et al. | 705/26 |
| 2003/0105704 A1 | 6/2003 | Sundel | 705/37 |
| 2003/0135432 A1 | 7/2003 | McIntyre et al. | |
| 2003/0160097 A1 | 8/2003 | Steiner | 235/385 |
| 2004/0010430 A1 | 1/2004 | Cinquini et al. | |
| 2004/0073435 A1 | 4/2004 | Rosenbaum | 705/1 |
| 2004/0078346 A1 | 4/2004 | Amonette et al. | |
| 2004/0083179 A1 | 4/2004 | Sesek et al. | 705/53 |
| 2004/0128265 A1 | 7/2004 | Holtz et al. | 705/406 |
| 2004/0143518 A1 | 7/2004 | Siegel | 705/28 |
| 2004/0143519 A1 | 7/2004 | Siegel | 705/28 |
| 2004/0172260 A1 | 9/2004 | Junger et al. | 705/1 |
| 2005/0038758 A1 | 2/2005 | Hilbush et al. | 705/402 |
| 2005/0203809 A1 | 9/2005 | Stone et al. | |

OTHER PUBLICATIONS

Machlis, Ecommerce=E returns, Dec. 1997.*
U.S. Patent Application entitled Method and System Providing Out-Sourced Merchandise Return Services, Serial No. unknown; Inventors, unknown.
UPS Autumn 2002 Forum, "The Far East is not so far," 12259 UPS Forum. ENG/SPEC 4 pages, Oct. 17, 2002.
U.S. Appl. No. 10/659,465 entitled "Method and System Using Return Labels with Dynamically Generated Multiple Datapoint Coding", filed by Edward J. Stashluk Jr. et al. Sep. 10, 2003.
U.S. Postal Rate Commission, "Opinion and Recommended Decision Approving Revised Stipulation and Agreement," 35 pages, May 14, 1998.
Petersen, "Online Purchases: Easy to get, hard to return," PC Week, 30, 2 pages, Feb. 14, 2000.
"Cattron acquires Theimeg," Modern Materials Handling, Boston, vol. 55, Iss. 11, 2 pages, Oct. 2000.
"J. Crew Selects Newgistics' Return Valet Service for Managing Product," Business Wire, 3 pages, Jan. 14, 2002.
"Carrier Route Definitions," CarrierRoutes.com, 6 pages, 2006.
USPTO Office Action for U.S. Appl. No. 10/750,935, by inventor Philip S. Siegel, 9 pages, May 1, 2008.
USPTO Office Action for U.S. Appl. No. 10/745,096, by inventor Terry Combs, 10 pages, May 5, 2008.
USPTO Office Action for U.S. Appl. No. 10/775,368, inventor Edward J. Stashluk Jr. et al., 16 pages, Jun. 12, 2008.
USPTO Office Action for U.S. Appl. No. 10/745,096, inventor Terry Combs, 10 pages, Nov. 14, 2008.
USPTO Office Action for U.S. Appl. No. 10/659,465, inventor Stashluk, et al., Sep. 25, 2008.
USPTO Final Office Action for U.S. Appl. No. 10/659,465, inventor Stashluk, et al., Apr. 3, 2009.
Advisory Action for U.S. Appl. No. 10/659,465, inventor Stashluk, et al., Jun. 12, 2009.
USPTO Office Action for U.S. Appl. No. 10/659,465, inventor Stashluk, et al., Aug. 20, 2009.
Notice of Abandonment for U.S. Appl. No. 10/659,465, inventor Stashluk, et al., Mar. 26, 2010.
USPTO Office Action for U.S. Appl. No. 10/751,216, inventor Philip S. Siegel, Mar. 29, 2005.
USPTO Office Action for U.S. Appl. No. 10/751,216, inventor Philip S. Siegel, Aug. 9, 2005.
USPTO Office Action for U.S. Appl. No. 10/751,216, inventor Philip S. Siegel, Jan. 26, 2006.
USPTO Office Action for U.S. Appl. No. 10/751,216, inventor Philip S. Siegel, Jul. 13, 2006.
USPTO Final Office Action for U.S. Appl. No. 10/751,216, inventor Philip S. Siegel, Dec. 27, 2006.
USPTO Advisory Office Action for U.S. Appl. No. 10/751,216, inventor Philip S. Siegel, Mar. 23, 2007.
USPTO Office Action for U.S. Appl. No. 10/751,216, inventor Philip S. Siegel, Jun. 14, 2007.
USPTO Final Office Action for U.S. Appl. No. 10/751,216, inventor Philip S. Siegel, Nov. 29, 2007.
USPTO Advisory Action for U.S. Appl. No. 10/751,216, inventor Philip S. Siegel, Feb. 13, 2008.
USPTO Office Action for U.S. Appl. No. 10/751,216, inventor Philip S. Siegel, May 16, 2008.
USPTO Notice of Non-Compliant Amendment for U.S. Appl. No. 10/751,216, inventor Philip S. Siegel, Jul. 9, 2008.
USPTO Final Office Action for U.S. Appl. No. 10/751,216, inventor Philip S. Siegel, Oct. 23, 2008.
USPTO Supplemental Final Office Action for U.S. Appl. No. 10/751,216, inventor Philip S. Siegel, Nov. 19, 2008.
USPTO Advisory Action for U.S. Appl. No. 10/751,216, inventor Philip S. Siegel, Feb. 19, 2009.
Examiner's Answer to Appeal Brief for U.S. Appl. No. 10/751,216 inventor Philip S. Siegel, Sep. 2, 2009.
USPTO Appeal Docketing Notice for U.S. Appl. No. 10/751,216, inventor Philip S. Siegel, Jan. 25, 2010.
USPTO BPAI Decision—Examiner Affirmed for U.S. Appl. No. 10/751,216, inventor Philip S. Siegel, May 17, 2012.
USPTO Request for Continued Examination and Amendment Filed with Request for Continued Examination for U.S. Appl. No. 10/751,216, inventor Philip S. Siegel, Jul. 17, 2012.

USPTO Notice of Allowance and Fees Due for U.S. Appl. No. 10/751,216, inventor Philip S. Siegel, Aug. 8, 2012.
USPTO Office Action for U.S. Appl. No. 10/750,935, inventor Philip S. Siegel, Jun. 14, 2007.
USPTO Final Office Action for U.S. Appl. No. 10/750,935, inventor Philip S. Siegel, Nov. 19, 2007.
USPTO Advisory Action for U.S. Appl. No. 10/750,935, inventor Philip S. Siegel, Feb. 13, 2008.
USPTO Final Office Action for U.S. Appl. No. 10/750,935, inventor Philip S. Siegel, Nov. 18, 2008.
USPTO Supplemental Final Office Action for U.S. Appl. No. 10/750,935, inventor Philip S. Siegel, Nov. 20, 2008.
USPTO Pre-Appeal Brief Conference Decision for U.S. Appl. No. 10/750,935, inventor Philip S. Siegel, Feb. 10, 2009.
Examiner's Action for U.S. Appl. No. 10/750,935, inventor Philip S. Siegel, Jul. 28, 2009.
USPTO Appeal Docketing Notice for U.S. Appl. No. 10/750,935, inventor Philip S. Siegel, Nov. 20, 2009.
USPTO BPAI Decision for U.S. Appl. No. 10/750,935, inventor Philip S. Siegel, May 1, 2012.
USPTO Notice of Allowance and Fees due for U.S. Appl. No. 10/750,935, inventor Philip S. Siegel, Aug. 10, 2012.
USPTO Final Office Action for U.S. Appl. No. 10/775,368, inventor Stashluk, et al., Dec. 24, 2008.
USPTO Advisory Action for U.S. Appl. No. 10/775,368, inventor Stashluk, et al., May 28, 2009.
USPTO Office Action for U.S. Appl. No. 10/775,368, inventor Stashluk, et al., Aug. 19, 2009.
USPTO Final Office Action for U.S. Appl. No. 10/775,368, inventor Stashluk, et al., Mar. 16, 2010.
USPTO Advisory Action for U.S. Appl. No. 10/775,368, inventor Stashluk, et al., Jun. 3, 2010.
USPTO Office Action for U.S. Appl. No. 10/775,368, inventor Stashluk, et al., Aug. 5, 2010.
USPTO Final Office Action for U.S. Appl. No. 10/775,368, inventor Stashluk, et al., Jan. 20, 2011.
Advisory Action for U.S. Appl. No. 10/775,368, inventor Stashluk, et al., Apr. 7, 2011.
USPTO Pre-Appeal Brief Conference Decision for U.S. Appl. No. 10/775,368, inventor Stashluk, et al., May 19, 2011.
Examiner's Answer to Appeal Brief for U.S. Appl. No. 10/775,368, inventor Stashluk, et al., Sep. 15, 2011.
USPTO Appeal Docketing Notice for U.S. Appl. No. 10/775,368, inventor Stashluk, et al., Dec. 28, 2011.
USPTO Office Action for U.S. Appl. No. 11/042,378, inventor Stashluk, et al., Feb. 12, 2009.
USPTO Final Office Action for U.S. Appl. No. 11/042,378, inventor Stashluk, et al., Sep. 16, 2009.
Notice of Abandonment for U.S. Appl. No. 11/042,378, inventor Stashluk, et al., Mar. 31, 2010.
USPTO Office Action for U.S. Appl. No. 10/745,096, inventor Combs, et al., Jun. 12, 2007.
USPTO Final Office Action for U.S. Appl. No. 10/745,096, inventor Combs, et al., Dec. 4, 2007.
Advisory Action for U.S. Appl. No. 10/745,096, inventor Combs, et al., Feb. 25, 2008.
Advisory Action for U.S. Appl. No. 10/745,096, inventor Combs, et al., Feb. 4, 2009.
Pre-Appeal Brief Conference Decision for U.S. Appl. No. 10/745,096, inventor Combs, et al., Mar. 26, 2009.
USPTO Office Action for U.S. Appl. No. 10/745,096, inventor Combs, et al., Aug. 24, 2009.
Examiner Interview Summary for U.S. Appl. No. 10/745,096, inventor Combs, et al., Nov. 25, 2009.
USPTO Final Office Action for U.S. Appl. No. 10/745,096, inventor Combs, et al., Mar. 31, 2010.
Advisory Action for U.S. Appl. No. 10/745,096, inventor Combs, et al., Jun. 21, 2010.
USPTO Office Action for U.S. Appl. No. 10/745,096, inventor Combs, et al., Oct. 29, 2010.
USPTO Final Office Action for U.S. Appl. No. 10/745,096, inventor Combs, et al., Apr. 26, 2011.
Advisory Action for U.S. Appl. No. 10/745,096, inventor Combs, et al., Jul. 15, 2011.
Pre-Appeal Brief Conference Decision for U.S. Appl. No. 10/745,096, inventor Combs, et al., Aug. 23, 2011.
Examiner's Answer to Appeal Brief for U.S. Appl. No. 10/745,096, inventor Combs, et al., Dec. 16, 2011.
Appeal Docketing Notice for U.S. Appl. No. 10/745,096, inventor Combs, et al., Feb. 14, 2012.
USPTO Office Action for U.S. Appl. No. 09/796,337, inventor Philip S. Siegel, Nov. 3, 2004.
USPTO Final Office Action for U.S. Appl. No. 09/796,337, inventor Philip S. Siegel, Jun. 6, 2005.
Advisory Action for U.S. Appl. No. 09/796,337, inventor Philip S. Siegel, Aug. 25, 2005.
USPTO Office Action for U.S. Appl. No. 09/796,337. inventor Philip S. Siegel, Nov. 4, 2005.
USPTO Final Office Action for U.S. Appl. No. 09/796,337, inventor Philip S. Siegel, Apr. 18, 2006.
Pre-Appeal Brief Conference Decision for U.S. Appl. No. 09/796,337, inventor Philip S. Siegel, Jul. 11, 2006.
Notice Defective Appeal Brief for U.S. Appl. No. 09/796,337, inventor Philip S. Siegel, Feb. 23, 2007.
Notice Defective Appeal Brief for U.S. Appl. No. 09/796,337, inventor Philip S. Siegel, Jul. 19, 2007.
Pre-Appeal Brief Conference Decision for U.S. Appl. No. 09/865,470, inventor Frederick L. Ross, Oct. 3, 2007.
Examiner's Answer to Appeal Brief for U.S. Appl. No. 09/865,470, inventor Frederick L. Ross, Jan. 29, 2008.
Appeal Docketing Notice for U.S. Appl. No. 09/865,470, inventor Frederick L. Ross, Oct. 17, 2008.
BPAI Decision (Ex Affirmed in Part) for U.S. Appl. No. 09/865,470, inventor Frederick L. Ross, Jul. 15, 2009.
Notice of Allowance and Fees Due for U.S. Appl. No. 09/865,470, inventor Frederick L. Ross, Nov. 19, 2009.
Notice of Allowance and Fees Due for U.S. Appl. No. 09/865,470, inventor Frederick L. Ross, Dec. 30, 2009.
Issue Notification for U.S. Appl. No. 09/865,470, inventor Frederick L. Ross, Apr. 21, 2010.
USPTO Office Action for U.S. Appl. No. 10/697,485, inventor Stashluk, et al., Mar. 16, 2006.
USPTO Office Action for U.S. Appl. No. 10/697,485, inventor Stashluk, et al., Jun. 13, 2006.
USPTO Final Office Action for U.S. Appl. No. 10/697,485, inventor Stashluk, et al., Jan. 5, 2007.
Advisory Action for U.S. Appl. No. 10/697,485, inventor Stashluk, et al., Mar. 19, 2007.
Pre-Appeal Brief Conference Decision for U.S. Appl. No. 10/697,485, inventor Stashluk, et al., Apr. 3, 2007.
Examiner's Answer for U.S. Appl. No. 10/697,485, inventor Stashluk, et al., Sep. 28, 2007.
Appeal Docketing Notice for U.S. Appl. No. 10/697,485, inventor Stashluk, et al., Jun. 4, 2008.
USPTO BPAI Decision for U.S. Appl. No. 10/697,485, inventor Stashluk, et al., Sep. 15, 2009.
Notice of Abandonment U.S. Appl. No. 10/697,485, inventor Stashluk, et al., Nov. 25, 2009.
USPTO Office Action for U.S. Appl. No. 10/745,096 inventor Combs, et al., Mar. 8, 2007.
USPTO Office Action for U.S. Appl. No. 09/796,337, inventor Philip S. Siegel, Nov. 29, 2007.
USPTO Final Office Action for U.S. Appl. No. 09/796,337, inventor Philip S. Siegel, May 29, 2008.
Advisory Action for U.S. Appl. No. 09/796,337, inventor Philip S. Siegel, Aug. 8, 2008.
Pre-Appeal Brief Conference Decision for U.S. Appl. No. 09/796,337, inventor Philip S. Siegel, Oct. 31, 2008.
Examiner's Answer for U.S. Appl. No. 09/796,337, inventor Philip S. Siegel, Mar. 4, 2009.
Appeal Docketing Notice for U.S. Appl. No. 09/796,337, inventor Philip S. Siegel, Jun. 3, 2009.
BPAI Reversal for U.S. Appl. No. 09/796,337, inventor Philip S. Siegel, May 2, 2011.

Notice of Allowance and Fees Due for U.S. Appl. No. 09/796,337, inventor Philip S. Siegel, May 13, 2011.
Notice of Allowance and Fees Due for U.S. Appl. No. 09/796,337, inventor Philip S. Siegel, Jun. 10, 2011.
Issue Notification for U.S. Appl. No. 09/796,337, inventor Philip S. Siegel, Sep. 21, 2011.
USPTO Office Action for U.S. Appl. No. 09/865,470, inventor Frederick L. Ross, Aug. 5, 2004.
USPTO Final Office Action for U.S. Appl. No. 09/865,470, inventor Frederick L. Ross, Feb. 10, 2005.
Advisory Action for U.S. Appl. No. 09/865,470, inventor Frederick L. Ross, May 6, 2005.
USPTO Office Action for U.S. Appl. No. 09/865,470, inventor Frederick L. Ross, Aug. 5, 2005.
USPTO Final Office Action for U.S. Appl. No. 09/865,470, inventor Frederick L. Ross, Feb. 3, 2006.
Advisory Action for U.S. Appl. No. 09/865,470, inventor Frederick L. Ross, Jun. 7, 2006.

* cited by examiner

SYSTEM AND METHOD FOR SINGLE-ACTION RETURNS OF REMOTELY PURCHASED MERCHANDISE

TECHNICAL FIELD

The present invention relates in general to electronic commerce transactions and, more particularly, to a method and system for performing single-action returns of remotely purchased items.

BACKGROUND

The Internet or World Wide Web is especially conducive to conducting electronic commerce. Many Web servers have been developed through which vendors can advertise and sell product. The products can include items (e.g., music) that are delivered electronically to the user over the Internet and items (e.g., books) that are delivered through conventional distribution channels (e.g., a shipping agent). A server computer system may provide an electronic version of a catalog that lists the items that are available. A user may browse through the catalog using a browser and select various items to purchase. When the user has completed selecting items to be purchased, the server computer system then prompts the user for information to complete the ordering of the items. This user-preference profile may include the user's name, the user's credit card number, a shipping address for the order as well as other information. The server computer system then typically confirms the order by sending a confirming web page to the client computer system.

In addition to security concerns, purchasing items over the Internet has forced many changes in habit for customary brick and mortar shoppers. Internet shoppers are not only no longer able to pick up, try on or otherwise interact with merchandise available for purchase, Internet shoppers are subject to significant changes in the procedures necessary to return an item purchased on-line.

The ability to simply carry a purchased item back to the retail counter from which it was purchased to request a refund does not typically exist for Internet shoppers. While some brick and mortar stores with Internet counterparts accept the return of merchandise purchased from their Internet counterparts, this is certainly the exception rather than the rule. Therefore, many Internet shoppers are faced with the logistical nightmare of having to return remotely purchased merchandise to a warehouse or returns facility operated by the Internet retailer.

There exists a myriad of issues with which an Internet customer must contend to return this remotely purchased merchandise. For example, is the item returnable, how will the refund be paid, what shipping agent should be used, how efficient is the long distance returns process, what happens if the package is lost or damaged in transit. These and many other issues are currently contributing to the limited acceptance that Internet commerce has experienced.

SUMMARY

In accordance with teachings of the present disclosure, a system and method are described for single-action returns of remotely purchased merchandise.

In one aspect of the present invention, a method for processing merchandise returns is provided. The method preferably includes identifying a user, gathering a transaction history associated with the identified user and displaying the transaction history associated with the identified user. The method may further include initiating a returns process in response to selection, by the user, of a transaction displayed in the transaction history.

In another aspect of the present invention, a method for processing merchandise returns is provided. The method is preferably operable to display, on a client system, a transaction listing containing transactions associated with a user, the transaction listing preferably including at least one individual transaction indicative of merchandise purchased by the user from a retailer. The method is preferably further operable to initiate a returns process in response to selection of at least one individual transaction by the user.

In yet another aspect of the present invention, a system for processing merchandise returns is provided. The system preferably includes at least one server communicatively coupled to a network wherein the server is operable to receive single-action requests from the network. Also preferably included in the system is at least one transaction database and at least one customer database communicatively coupled to the server. A program of instructions, executable by the server, is also preferably included. The program of instructions is preferably operable to access a client identifier included in the return request, identify a customer in the customer database based upon the client identifier and create at least one transaction listing from transactions included in the transaction database associated with the identified customer.

The present invention provides a method and system for single-action returns of remotely purchased merchandise in a client/server environment. The single-action returns capability of the present invention reduces the number of user interactions needed to return an item and reduces the amount of sensitive information that is transmitted between a client system and a server system.

In one embodiment, the server system preferably assigns a unique client identifier to each client system. The server system may also store user-specific return information to enable the processing of merchandise return transactions by the user. The user-specific information may have been collected from a previous return by the user or by some other method. The server system preferably maps each client identifier to a user that may use that client system to return an item of merchandise. The server system may map the client identifiers to the user who last returned an item using that client system. When a user wants to return an item of merchandise, the user preferably uses a client system to send a return request along with their client identifier to a server system. The server system then preferably determines whether the client identifier for that client system is mapped to a user. If so mapped, the server system determines whether single-action returns is enabled for that user at that client system. If enabled, the requested information is sent (e.g., via a web page) to the client computer system along with an indication of the single action to be performed which will begin the process of returning an item of merchandise.

When single-action returns are enabled, the user need only perform a single action (e.g., click a mouse button) to process the return of selected item(s). When the user performs that single action, the client system notifies the server system. The server system then preferably completes the merchandise return by adding the user-specific return information for the user that is mapped to that client identifier to the item return information (e.g., product identifier, retailer, credit account, etc.). Also, since the client identifier identifies a user-preference profile preferably stored at the server system, there is no need for sensitive information to be transmitted via the Internet or other communications medium.

The present invention provides a method and system for returning a remotely purchased item using a client system. The client system is provided with an identifier that identifies a customer. The client system preferably displays information that identifies a user's transaction history and displays an indication of an action (e.g., a single action such as clicking a mouse button) that a user is to perform to return an undesired item of merchandise. In response to the indicated action being performed, the client system preferably sends to a server system the provided identifier and a request to return the identified item or items of merchandise. The server system uses the identifier to identify any additional information needed to process the return of selected item(s) and then completes the return process including managing the shipping of the merchandise and the crediting of a consumer account.

A server system is preferably employed which receives and stores the additional information for customers using various computer systems so that the server system can process such returns. The server system preferably stores the received additional information associated with an identifier of the customer and provides the identifier to the client system. When requested by the client system, the server system preferably provides information describing the item(s) to the requesting client system. When the server system receives a return request from a client system, the server system combines the additional information stored in association with the identifier included in the return request to effect the return of the item(s).

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The preferred embodiments of the present invention and its advantages are best understood by referring to the FIGS. 1-7C of the drawings, like numerals being used for like and corresponding parts of the various drawings.

Figure 1A:
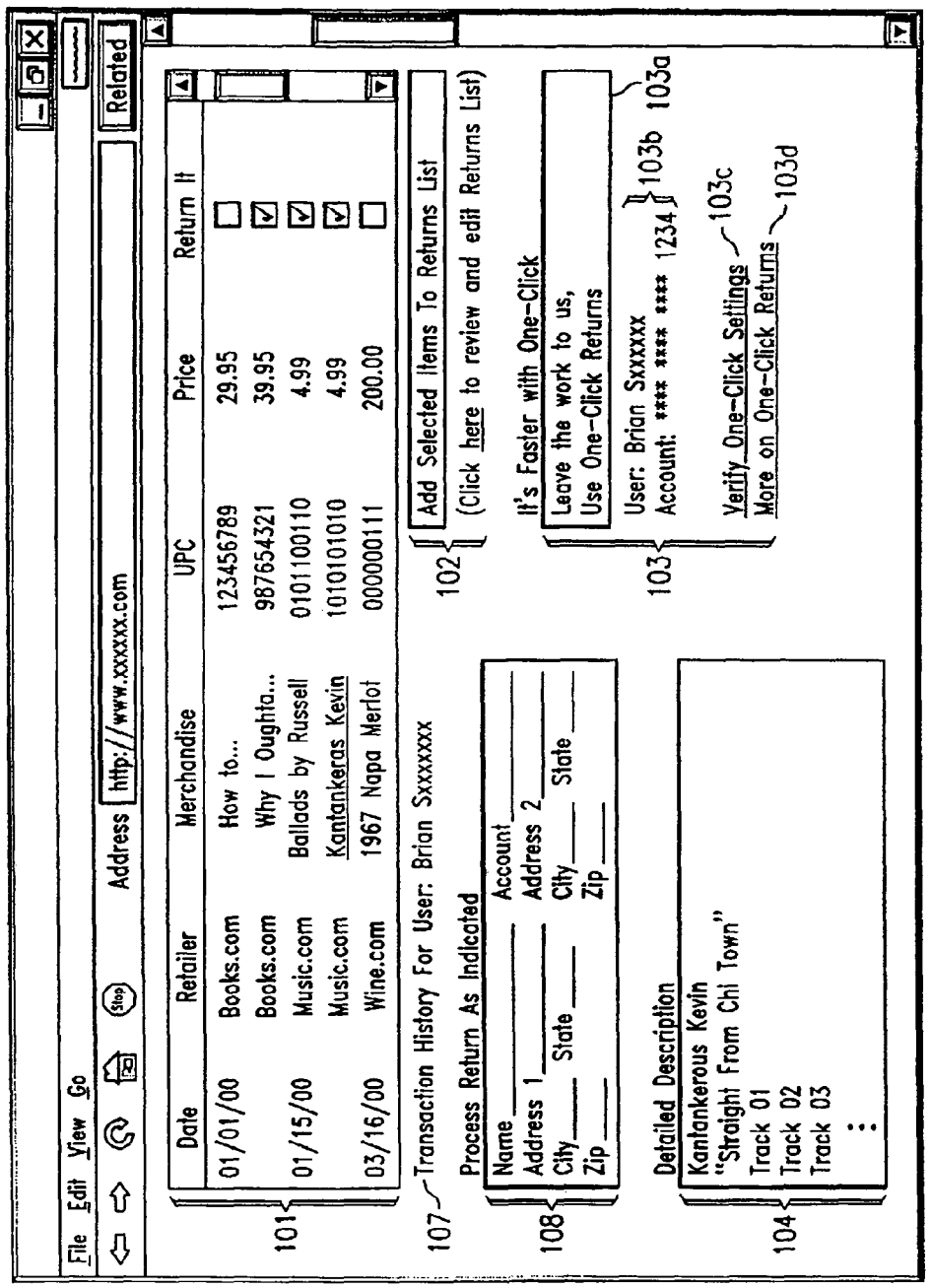
FIGS. 1A-1B illustrate web pages incorporating teachings of the present invention.
Figure 1B:
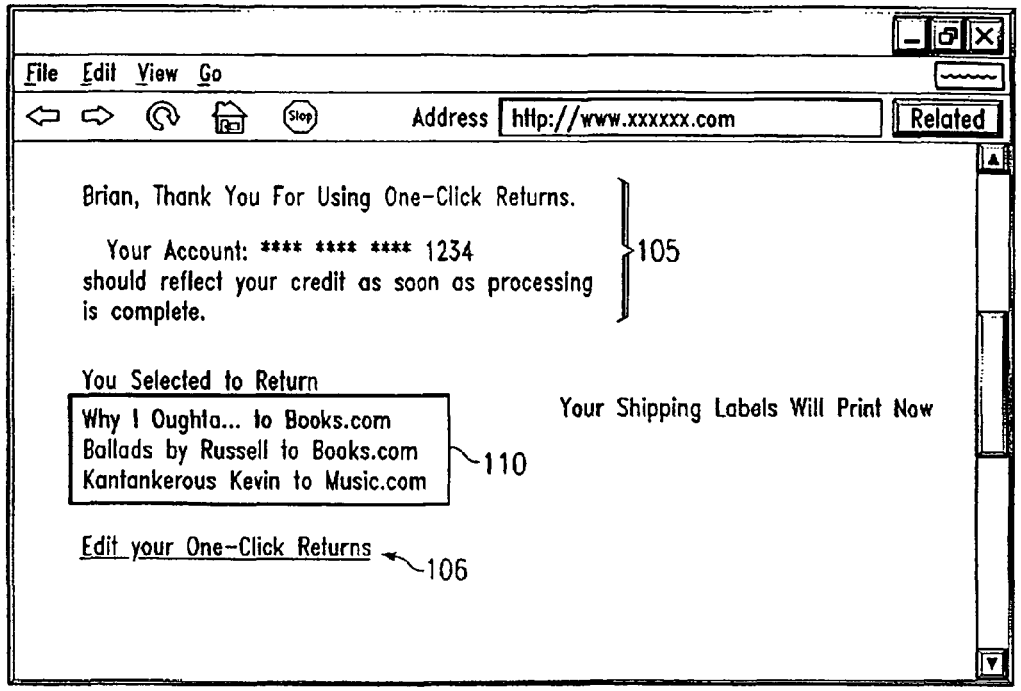

FIGS. 1A-1B illustrate web pages incorporating teachings of the present invention. Specifically, FIG. 1A illustrates a web browser displaying a web page containing transaction history 101 which includes individual transactions indicative of merchandise purchased by a user logged on to a client system. This example web page was preferably sent from a server system to the client system when the user logged on to the client system and requested to process a merchandise return. This example web page contains transaction listing 101, returns summary section 102, single-action returns section 103, detailed item description section 104, user identification section 107, and returns information section 108. One skilled in the art can appreciate that these various sections may be omitted, rearranged or adapted in various ways without departing from the spirit and scope of the present invention. In general, the user is preferably made aware of the item or items to be returned by the single action and of the single action needed to begin the returns process.

Transaction listing 101 and detailed item description section 104 preferably provide information that identifies and describes the item(s) selected by the user and which may be returned. The server system adds transaction listing 101 and detailed item description 104 to each web page for the item(s) the user has purchased from various retailers. The server system, however, preferably adds single-action returns section 103 when single-action ordering is enabled for the user logged onto the client system. One skilled in the art would appreciate that a single web page on the server system may contain all these sections but single-action returns section 103 may be selectively included or excluded before sending the web page to the client system.

Single-action returns section 103 allows the user to specify, with a single action such as a single click of a mouse button, to return items of merchandise selected from individual transactions contained in transactions listing 101. Once the user has performed the preferred single action, the returns process for the selected item(s) is initiated. Single-action returns section 103 preferably contains single-action return button 103a, user identification subsection 103b, and single-action return information subsections 103c and 103d.

User identification subsection 103b preferably displays enough information such that the logged on user can be assured that the server system has correctly recognized them. To reduce the chances of sensitive information being intercepted, the server system preferably sends only enough information to the client system so that the user is confident that the server system has correctly identified the user, yet not enough information to be useful to an unscrupulous interceptor.

Single-action returns information subsections 103c and 103d allow the user to view or edit various settings in their user preference profile for single-action returns or to obtain more information related to the single-action returns functionality. If the user wants to verify accounts to be credited, or other user-specific information, the user can select the "Verify One-Click Settings" link 103c to view and/or edit their user preference profile. In response to selection of "Verify One-Click Settings" link 103c, the server system may require the user to perform a "server login" so that the identity of the user can be verified before any confidential information is viewed or modified. The server system then sends a web page to the client system for display and possible modification of the user specific information contained in the user preference profile. In this way, the transmission of sensitive information can be minimized or avoided unless requested by the verified user.

When the user selects single-action returns button 103a, the client system sends a return request to the server system indicating the user's desire that the merchandise items associated with transactions selected in transaction listing 101 be returned. After the server system receives the return request, the server system provides the client system with a new web page confirming the receipt of the return request. The processing of the client system and the server system will be discussed in greater detail below.

FIG. 1B illustrates the display of a web page confirming server system receipt of a single-action return request. The confirmation web page preferably contains essentially the same information as the web page containing transactions listing 101 (i.e., FIG. 1A) except that return request confirmation section 105 is displayed at the top of the web page. Return request confirmation section 105 confirms that the single-action return request has been received and the return request is being processed. The return request confirmation web page also provides link 106 to allow the user to review and change the single-action returns in returns listing 110. In an alternate embodiment, the return request confirmation web page can be identical to the web page containing transaction listing 101, as illustrated in FIG. 1A, except that single-action returns button 103a is replaced with a message confirming the return request (not expressly illustrated).

If single-action returns is not currently enabled for the client system but could be enabled, the server system preferably generates a web page similar to that illustrated in FIG. 1A, except that single-action returns button 103a is replaced by a single-action returns enable button (not expressly illustrated). Such a button preferably contains text instructing the user to click on the button to enable single-action returns. When the user clicks on the button, the server system preferably sends the web page of FIG. 1A to the client system for display. Single-action returns can be enabled whenever the server system has stored sufficient user-specific information in a user preference profile for that user or client system to complete a single-action return. If the server system does not have sufficient information, when the user selects single-action returns button 103a, or an enable single-action returns button (not expressly shown) the server system preferably provides a web page to collect any additional information necessary. The server system may require the user to "login" so that the identity of the user can be verified before the single-action returns capability is enabled or confidential information is shared.

Figure 2:
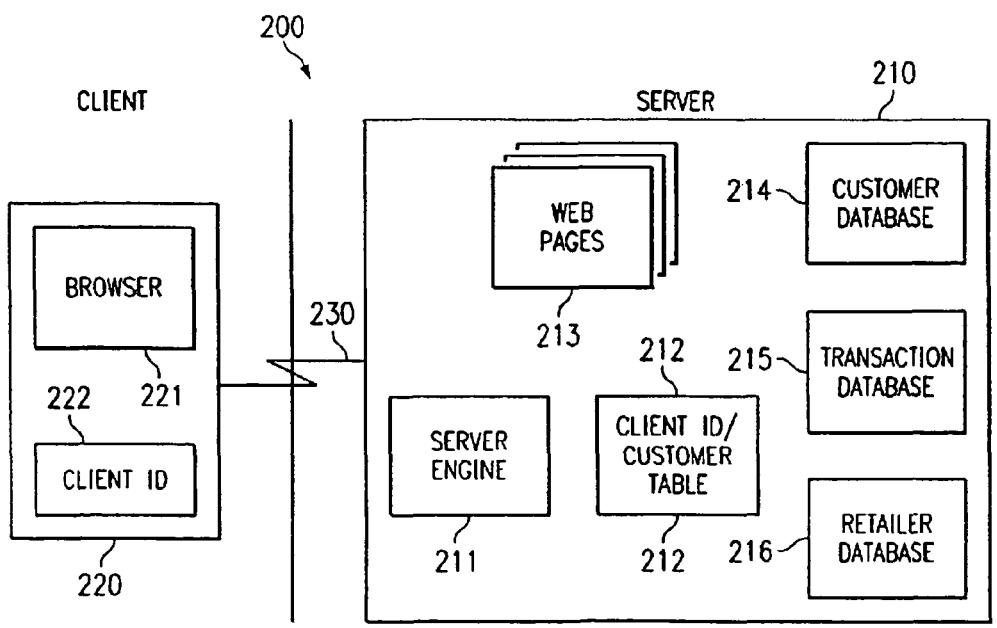
FIG. 2 is a block diagram illustrating a system incorporating teachings of the present invention.

FIG. 2 is a block diagram illustrating a system incorporating teachings of the present invention. System 200 preferably supports single-action returns over the Internet using the World Wide Web. Server system 210 includes server engine 211, client identifier/customer table 212, various web page templates 213, customer database 214, transaction database 215, and retailer database 216. Server engine 211 preferably receives HTTP (Hypertext Transfer Protocol) requests to access web pages identified by URLs (Universal Resource Locator) and provides the web pages to the various client systems 220. Such an HTTP request may indicate that the user has performed the single action necessary to effect single-action returns.

Customer database 214 preferably contains customer information for various users or potential users. Customer information may include user-specific return information such as the name of the customer, credit information, and shipping information in a user preference profile. Transaction database 215 preferably contains entries indicative of transactions associated with registered users, preferably transactions which were performed at single-action returns participating retailers. Retailer database 216 contains a listing of the various retailers that participate in a local returns of remotely purchased merchandise program. Client identifier/customer table 212 contains a mapping from each client identifier, which is a globally unique identifier that uniquely identifies a client system, to the customer last associated with that client system.

Client system 220 preferably contains browser 221 and assigned client identifier 222. The client identifier 222 is preferably stored in a file as a "cookie." In one embodiment, server system 210 assigns and sends client identifier 222 to client system 220 when client system 220 first interacts with server system 210. From then on, client system 220 includes its own client system identifier 222 with all messages sent to server system 210 so that server system 210 can identify the source of a communication or return request. Server system 210 and client system 220 interact by exchanging information via communications link 230, which preferably includes transmission over the Internet. Server system 210 may also retrieve transaction information from various retailer databases remotely located, as may be indicated in retailer database 216, with respect to server system 210 via communications link 230.

One skilled in the art can appreciate that the single-action returns teachings of the present invention can be used in various environments other than the Internet. For example, various communication channels may be used such as a local area network, a wide area network, or a point-to-point dial up connection. Also, server system 210 may comprise any combination of hardware or software capable of processing returns in response to the single action teachings of the present invention. Client system 220 may comprise any combination of hardware or software that can interact with server system 210. Systems 210 and 220 may include television-based systems or various other consumer products capable of electronic commerce transactions.

Figure 3:
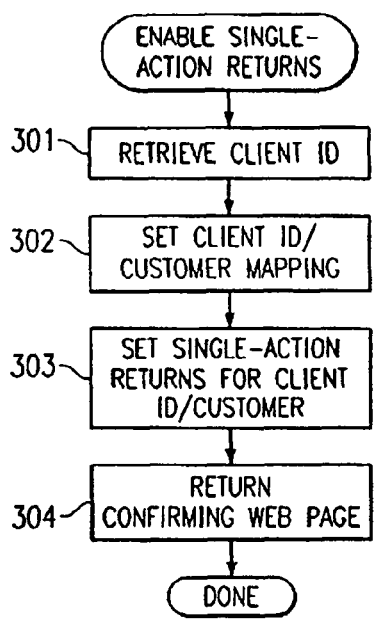
FIG. 3 is a flow diagram of a routine capable of enabling single-action returns according to one embodiment of the present invention.

FIG. 3 is a flow diagram of a routine capable of enabling single-action returns for a user according to one embodiment of the present invention. To enable single-action returns, server system 210 preferably has information about the user contained in a user preference profile that is stored in customer database 214. Server system 210 can obtain this information in various ways. First, server system 210 can ask the user if they would like to have single-action returns enabled. If so, server system 210 could then prompt the user using a web page to obtain user-specific return information for inclusion in a user preference profile. Second, server system 210 could save the user-specific return information collected during a first return request processing. Server system 210 could then, either automatically or with the user's consent, enable single-action returns.

In step 301, server system 210 retrieves client identifier 222 preferably included in a message sent by client system 220. In step 302, server system 210 updates client identifier/customer table 212 to indicate that client identifier 222 has been associated with that user. In step 303, server system 210 preferably sets a flag indicating that single-action returns is enabled for client identifier 222 and the user currently using client system 220. The flag may be stored in the client identifier/customer table 212. In step 304, server system 210 supplies a confirming web page, as illustrated in FIG. 1B, to client system 220 for display. The next time a user wishes to return an item of merchandise, client system 220 will supply its client identifier 222 to server system 210. If single-action returns is enabled for that user, server system 210 preferably assumes that the user at client system 220 is the customer associated with that client identifier 222 in the client identifier/customer table 212. Thus, for security reasons, a user may not want to allow server system 210 to enable single-action returns if there is a possibility that someone else may use that same client system 220. An alternative to automatically enabling single-action returns is to have the user log on to server system 210.

Figure 4:
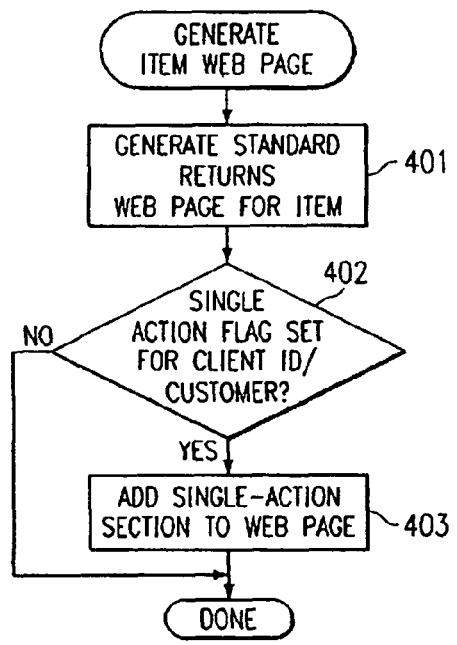
FIG. 4 is a flow diagram capable of generating a web page in which single-action returns is enabled according to one embodiment of the present invention.

FIG. 4 is a flow diagram of a routine capable of generating a web page in which single-action returns is enabled according to one embodiment of the present invention. When single-action returns is enabled, server system 210 preferably generates a web page, similar to that illustrated in FIG. 1A, including single-action returns section 103 as indicated at step 401. In one embodiment, server system 210 adds partial user-specific return information 103b from the user preference profile to the web page displayed. Information displayed may include the customer's name, the last four digits of a credit card number, or a nickname selected by the user. Such information is preferably kept to the minimum amount of information necessary to indicate to the user whether or not server system 210 is using the correct user preference profile. In step 402, if the single-action returns flag has been set for client identifier 222 and customer combination, then server system 210 continues at step 403, else server system 210 completes. In step 403, server system 210 adds single-action returns section 103 to the web page displayed and completes.

Figure 5:
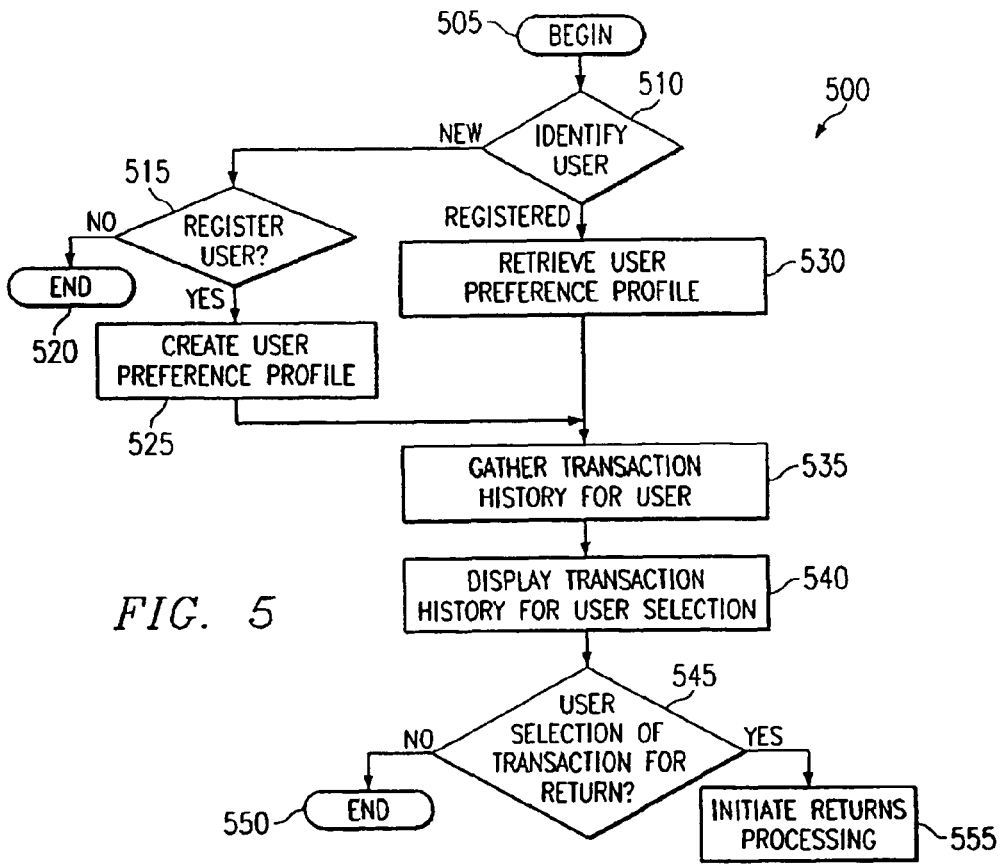
FIG. 5 is a flow diagram of a routine capable of processing a single-action return according to one embodiment of the present invention.

FIG. 5 is a flow diagram of a routine capable of processing single-action returns according to one embodiment of the present invention. In one embodiment of the present invention, the method of FIG. 3 can be implemented within the method of FIG. 5.

Method 500 of FIG. 5 begins at step 505. Once initialized, method 500 proceeds to step 510. At step 510, the user of client system 220 is identified. One method of identifying the user of client system 220 is the method of FIG. 3. An alternative method of identifying the user of client system 220 is to obtain and review client identifier 222, if one is present, on client system 220. If the user of the client system is a new user, i.e., not yet registered or no client identifier 222 is provided, method 500 proceeds to step 515.

At step 515, it is determined whether or not the user is to be registered. This determination can be made by prompting the user, or by other means. If the new user does not wish to be registered for single-action returns services or it is determined that the user is not to be registered, method 500 proceeds to step 520 where method 500 is ended. If the new user wishes to enable single-action returns, method 500 proceeds to step 525.

At step 525, a user preference profile for the new user is created and stored preferably on server system 210. Once the new user is registered and the user preference profile stored, a client identifier 222 is deposited on client system 220 and method 500 proceeds to step 535.

If at step 510, the user on client system 220 is identified as a registered user, i.e., a client identifier 222 exists on client system 220, method 500 proceeds to step 530. At step 530, the user preference profile of the registered user is retrieved and mapped using customer database 214 and client ID/customer table 212. Once the user preference profile has been retrieved, such as at step 530, or created, such as at step 525, method 500 proceeds to step 535.

At step 535, a transaction history for the user is preferably retrieved from transactions database 215. Transactions database 215 is preferably maintained by server system 210. However, transactions database 215 can be maintained at another location as well as created real-time from a collection of databases located at member retail sites, credit card sites or other data bases. Once an appropriate transaction history for the registered user has been retrieved at step 535, method 500 proceeds to step 540.

At step 540, the transaction history retrieved at step 535 is preferably displayed to the user for their perusal and subsequent selection of items of merchandise to be returned. The transaction history is preferably displayed in a manner similar to that illustrated in FIG. 1A. In addition to the transaction history, single-action returns section 103 of the present invention is also preferably included on the displayed web page. Once transaction history 101 and other desired components of a single-action returns web page are displayed, method 500 proceeds to step 545.

At step 545, method 500 waits or loops until the user selects a transaction or item to be processed for returns. If a transaction or item is not selected within a predetermined amount of time, method 500 proceeds to step 550 where method 500 ends. Method 500 is designed to end after a predetermined amount of time for security reasons which can arise from client system 220 being left unattended or for other computer security threats. In response to the selection of an item to be returned and the subsequent selection of single-action returns button 103a at step 545, method 500 proceeds to step 555. At step 555, the processing necessary for the return of the selected item or items of merchandise is initiated.

Figure 6A:
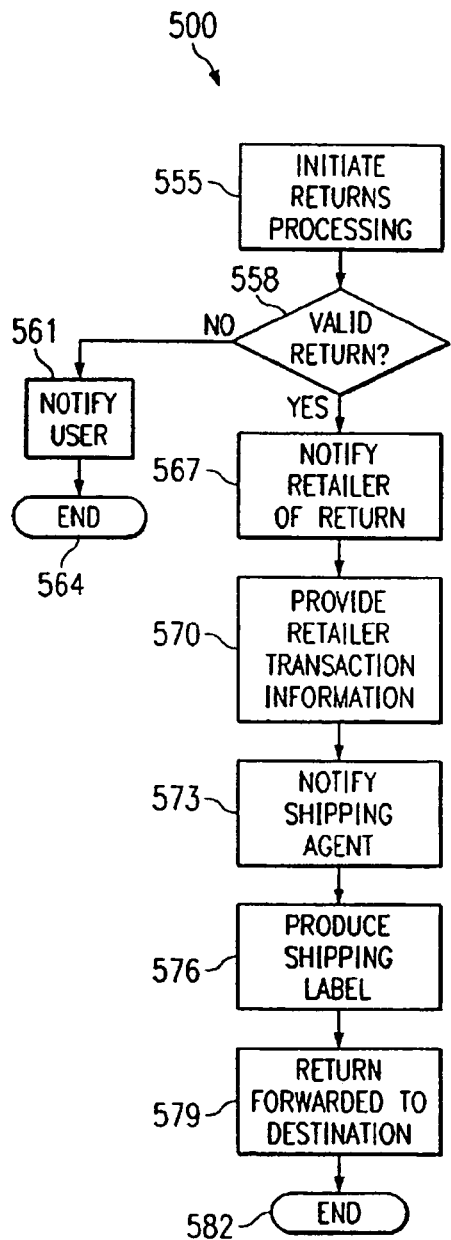
FIGS. 6A-6B illustrate flow diagrams capable of completing the processing of a return request incorporating teachings of the present invention.

Referring now to FIG. 6A, one embodiment of a flow diagram capable of completing the processing of a return request incorporating teachings of the present invention is shown. As illustrated in the embodiment of FIG. 6A, in response to the initiation of returns processing at step 555, method 500a proceeds to step 558.

At step 558, the selected item or transaction is evaluated to determine whether or not the return is a valid return. One method of validating a return might involve comparing the item to be returned against a returns rule set for the retailer from which the item was purchased. Alternatively, if the transaction represented the purchase of a perishable item, a return might be determined to not be valid. If it is determined that the selected transaction or item is not a valid return, method 500a proceeds to step 561.

At step 561, the user is notified of the invalid return such as by a web page, email, or other capable means. Once the user has been notified that the return is invalid at step 561, method 500a ends at step 564. As an alternative to ending at any end step of methods 500, 500a or 500b, methods 500, 500a or 500b can return to a previous step, such as step 540 where the transaction listing is displayed to the user, or perform other actions within the spirit and scope of the present invention.

If at step 558, it is determined that the selected item or transaction for return is valid, method 500a proceeds to step 567. At step 567, the retailer from which the item was purchased is notified of the pending merchandise return. After the appropriate retailer is notified at step 567, the transaction information and the necessary user specific information such as that contained in the user preference profile, is provided to the retailer at step 570.

In addition to providing the retailer the necessary transaction information and the necessary user specific information at step 570, a shipping agent is notified of the need for a package pick up such that the item selected by the user may be returned at Step 573. To further simplify processing for both the shipping agent and the user, a return shipping label is preferably produced for the user to place on the package in which the merchandise for return will be shipped back to the retailer at step 576. It is also possible to have shipping paperwork generated and printed out at the facility of the shipping agent. At step 579, the package, once picked up by the shipping agent, is forwarded to the appropriate destination, such as a retailer depot, auction site, etc. Method 500a completes returns processing at step 582.

Figure 6B:
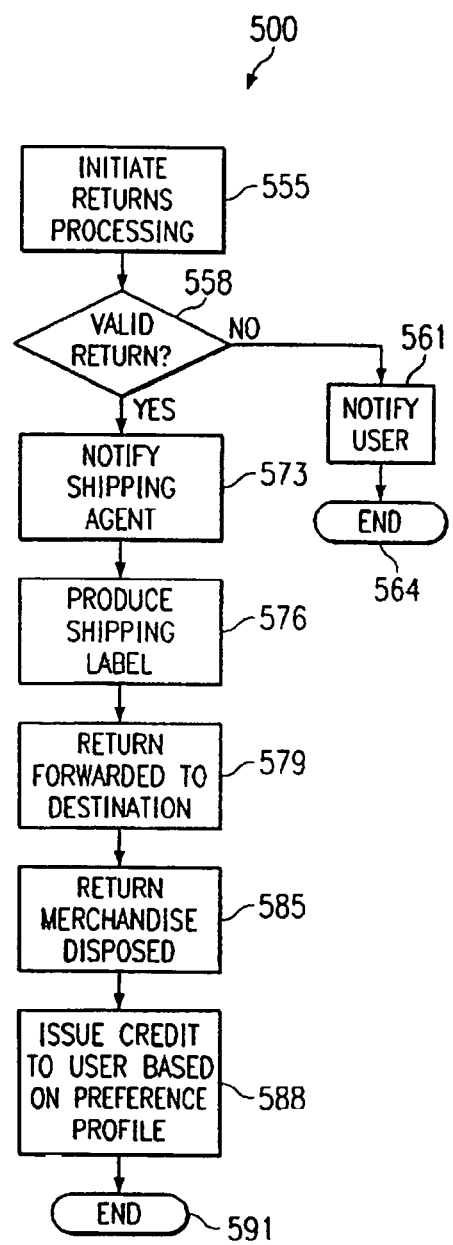

Referring now to FIG. 6B, an alternate embodiment of a flow diagram capable of completing the processing of a single-action return request incorporating teachings of the present invention is shown. Similar to FIG. 6A, in response to the initiation of returns processing at step 555, method 500b proceeds to step 558.

At step 558, the selected item or transaction is evaluated to determine whether or not the return is a valid return. One method of validating a return might be to compare the item to be returned against a returns rule set for the retailer from which the item was purchased. Alternatively, if the transaction represented the purchase of a perishable item, a return might be determined to not be valid. If it is determined that the selected transaction or item is not a valid return, method 500b proceeds to step 561.

At step 561, the user is notified of the invalid return. Once the user has been notified that the return is invalid at step 561, method 500b ends at step 564.

If at step 558, it is determined that the selected item or transaction for return is valid, method 500b proceeds to step 573. At step 573, a shipping agent is notified of a package pick up for the return of the item selected by the user. To further simplify processing for both the shipping agent and the user, a return shipping label is preferably produced for the user to place on the package in which the return will be shipped at step 576. At step 579, the package, once picked up by the shipping agent, is forwarded to its appropriate destination.

Once the merchandise to be returned has been received at its destination or while the merchandise is in transit, the merchandise is disposed of at step 585. The present invention envisions a variety of different methods by which the returned merchandise may be disposed of. For example, the merchandise may be auctioned on an auctioning web-site, a live auction may be employed to dispose of the returned merchandise, or as illustrated in FIG. 6A, the merchandise may be returned to the retailer from which it was purchased.

Once the merchandise has been disposed of at step 585, the proceeds of the disposal are credited to the user based upon settings available in the user preference profile at step 588. This method of disposal allows an auctioning agent to obtain the best price for the returned merchandise and to collect a commission for their role in the disposition of the merchandise should they desire. For products which get returned to the retailer from which they were purchased, the user may be able to obtain a full refund for the unwanted merchandise from the retailer. Other methods of merchandise disposal are considered within the spirit and scope of the present invention. Once the user has been appropriately credited, method 500b completes at step 591.

To help minimize shipping costs and user confusion, the server system may combine various single-action returns into a multiple-item return. For example, if a user wishes to return more than one item to any given retailer or central depot, those returns may be cost effectively combined into a single return for shipping. As such, the server system preferably combines the single-action returns when their destination addresses are the same.

Figure 7A:
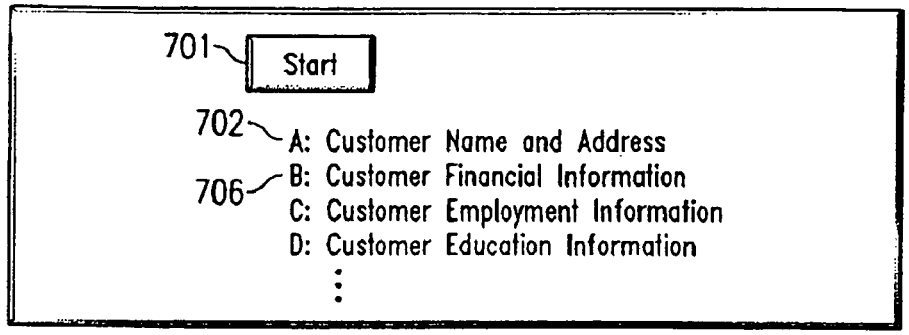
FIGS. 7A-7C illustrate a user preference profile hierarchical data entry mechanism according to one embodiment of the present invention.
Figure 7B:
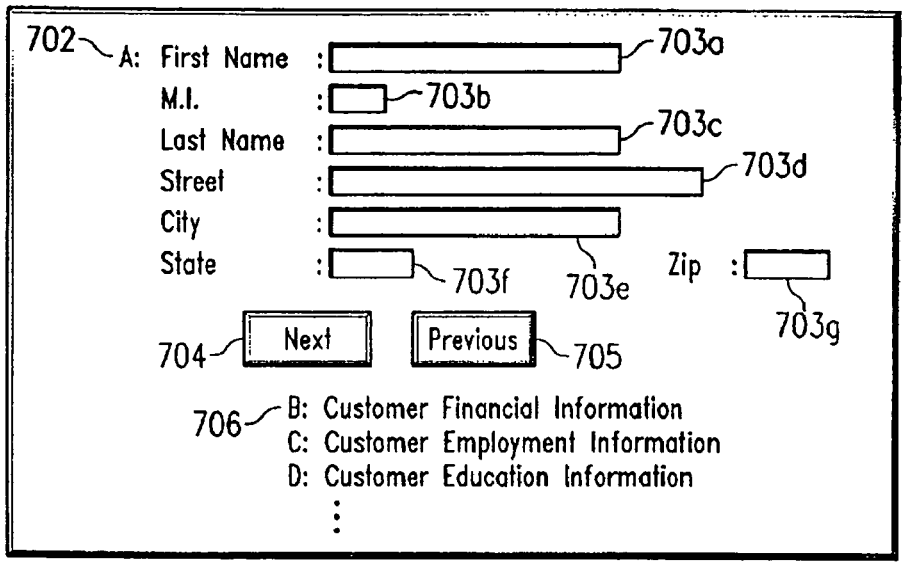
Figure 7C:
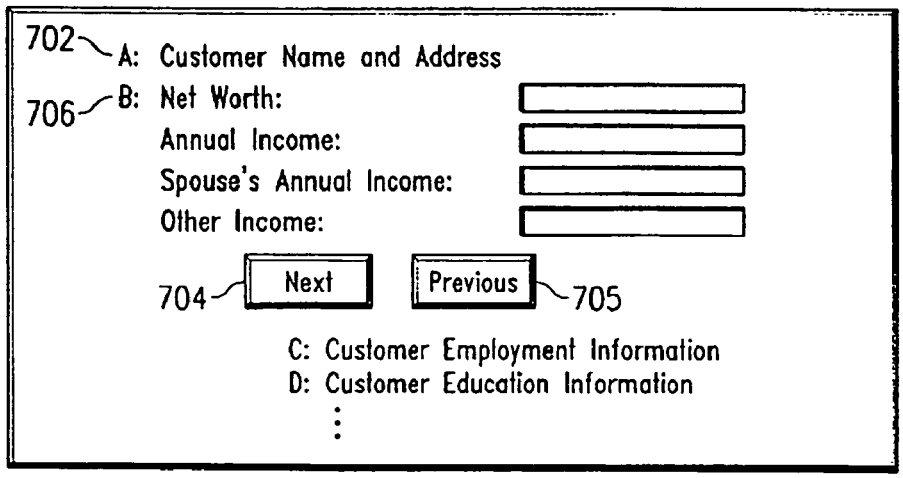

FIGS. 7A-7C illustrate a hierarchical data entry mechanism in one embodiment. When collecting information from a user such as for a user preference profile, a web page typically consists of a long series of data entry fields that may not all fit onto the display at the same time. Thus, a user needs to scroll through the web page to enter the information. When the data entry fields do not fit onto the display at the same time, it is often difficult for the user to get an overall understanding of the type and organization of the data to be entered. The hierarchical data entry mechanism allows a user to understand the overall organization of the data to be entered even though the all data entry fields would not fit onto the display at the same time.

FIG. 7A illustrates an outline format of a sample form to be filled in. The sample form contains various sections identified by letters A, B, C, and D. When the user selects start button 701, section A 702 expands to include the data entry fields 703a-g illustrated if FIG. 6B for the user preference profile information.

FIG. 7B illustrates the expansion of section A 702. Since only section A 702 has been expanded, the user can view the data entry fields 703a-g of section A 702 and summary information associated with sections B, C, and D at the same time. The user then enters data in the various data entry fields 703a-g that are displayed. Upon completion, the user selects either next button 704 or previous button 705. Next button 704 causes section A 702 to be collapsed and section B 706 to be expanded so that financial information may be entered.

FIG. 7C illustrates the expansion of section B 706. If previous button 705 had been selected, section A 702 would have collapsed as shown in FIG. 7A. This collapsing and expanding can be repeated for each section. At any time during the data entry process, if an error is detected, a web page is preferably generated with the error message in close proximity to the data entry field 703a-g that contains the error. This web page is then displayed by client system 220 to inform the user of the error. In addition, each of the data "entry" fields may not be editable until the user clicks on the data entry field 703a-g or selects an edit button (not expressly shown) associated with the data entry field. In this way, the user is prevented from inadvertently changing the contents of a data entry field 703a-g. When the user clicks on a data entry field 703a-g, a new web page may be presented to the user that allows for the editing of the data associated with the field. When editing is complete, the edited data is preferably displayed in data entry field 703a-g. Also, the form is more compact because the various data entry options (e.g., radio button) are displayed only on the new web page when the field is to be edited.

Although the present invention has been described in terms of various embodiments, it is not intended that the invention be limited to these embodiments. Modification within the spirit of the invention will be apparent to those skilled in the art. For example, server system 210 may map client identifier 222 to multiple customers who have recently used client system 220. Server system 210 can then allow the user to identify themselves by selecting one of the mappings based preferably on a display of partial user-specific order information. Also, various different single actions can be used to effect the return of an item. For example, a voice command may be spoken by the user, a key may be depressed by the user, a button on a television remote control device may be depressed by the user, or selection using any pointing device may be effected by the user. Although a single action may be preceded by multiple physical movements of the user (e.g., moving a mouse and clicking selected items or transactions for return), the single action generally refers to a single event received by client system 220 that indicates the desire to return any selected items or transactions. Finally, the user can be alternately identified by a unique customer identifier 222 that is provided by the customer when the customer initiates access to server system 210 and sent to server system 210 with each message. Customer identifier 222 could be also stored persistently on client system 220 so that the user does not need to re-enter their customer identifier 222 each time access is initiated.

Although the present invention has been described in detail, it should be understood that various changes, substitutions and alterations can be made thereto without departing from the spirit and scope of the invention.

What is claimed is:

1. A method for processing the returns of merchandise purchased through the World Wide Web comprising:

receiving, from a consumer, an electronic request via a computerized system associated with the consumer, the electronic request requesting to initiate processing of one or more items of merchandise purchased by the consumer in a prior purchase transaction;

in response to receiving the electronic request from the computing system associated with the consumer, gathering transaction history data associated with the consumer from a computerized database;

displaying the transaction history associated with the identified consumer to the consumer on the computerized system associated with the consumer, the transaction history identifying a listing of merchandise associated with the consumer;

in response to and after displaying the transaction history, receiving an electronic selection, generated by the consumer on the computerized system associated with the consumer, of a particular item of merchandise within the listing of merchandise in the displayed transaction history, the electronic selection comprising a click on the particular item of merchandise within the list of merchandise and identifying the particular item of merchandise for returns processing; and in response to receiving the electronic selection comprising the click on the particular item of merchandise within the list of merchandise, initiating a returns process for the particular item of merchandise selected by the consumer from the list of merchandise purchased by the consumer in the prior purchase transaction, the returns process initiated by a returns server.

2. The method of claim 1 further comprising retrieving a preference profile for the identified consumer.

3. The method of claim 2 further comprising crediting a consumer account indicated in the consumer preference profile based upon the item selected.

4. The method of claim 1 further comprising notifying a retailer associated with the item selected by the consumer.

5. The method of claim 4 further comprising providing the retailer with the transaction information and consumer information associated with the item selected by the consumer.

6. The method of claim 1 further comprising generating a return shipping label for the merchandise to be returned.

7. The method of claim 1 further comprising notifying a shipping provider of a merchandise return to be picked up.

8. The method of claim 1 further comprising:
auctioning the merchandise selected for return by the consumer.

9. The method of claim 1 further comprising communicating between a client system and a server system via the Internet.

10. The method of claim 2, further comprising completing the returns process based upon settings in the consumer preference profile.

11. The method of claim 2, wherein the consumer preference profile comprises a name associated with the consumer, credit information associated with the consumer, and shipping information associated with the consumer.

12. The method of claim 1, wherein identifying the consumer comprises identifying the consumer using a login process.

13. The method of claim 12, further comprising requesting transaction history data from a retailer on a real-time basis upon identifying the consumer using the login process.

14. The method of claim 1, further comprising receiving transaction history data from a retailer on a periodic basis.

15. The method of claim 1, wherein the listing of merchandise in the transaction history is indicative of merchandise purchased by the consumer from an retailer.

16. The method of claim 1, further comprising identifying the consumer, wherein identifying the consumer comprises receiving a client system identifier in a message from the consumer.

17. The method of claim 1, wherein initiating the return process comprises validating the item of merchandise selected to authorize the return of the item of merchandise.

18. The method of claim 1, wherein initiating the return process comprises comparing information associated with the selection of the item of merchandise to at least one return rule of a retailer associated with the transaction.

19. The method of claim 1, wherein initiating the return process comprises determining if the selected item of merchandise is perishable.

20. The method of claim 1, wherein initiating the return process comprises using the computerized system associated with the consumer to generate a return shipping label to be used to return the selected item.

21. A method for processing the returns of merchandise purchased through the World Wide Web comprising:

receiving login information from a consumer associated with the purchase of one or more items of merchandise, the login information received from a computerized system associated with the consumer;

using the login information to complete a login process to identify the consumer;

gathering transaction history data associated with the identified consumer from a computerized database;

causing the transaction history associated with the identified consumer to be displayed to the consumer on the computerized system associated with the consumer, the transaction history identifying a listing of merchandise having been purchased by the consumer from a retailer;

in response to and after displaying the transaction history, receiving an electronic selection, generated by the consumer, of a particular item of merchandise within the listing of merchandise in the displayed transaction history, the electronic selection comprising a click on the particular item of merchandise within the list of merchandise and identifying the particular item of merchandise for returns processing; and in response to receiving the electronic selection comprising the click on the particular item of merchandise within the list of merchandise, initiating a returns process for the particular item of merchandise selected by the consumer from the list of merchandise purchased by the consumer in a prior purchase transaction, the returns process initiated by a returns server.

* * * * *